Patented Oct. 31, 1939

2,178,139

UNITED STATES PATENT OFFICE 2,178,139

SULPHO-CARBOXYLIC ACID ESTERS OF ALCOHOL AMINE DERIVATIVES

Albert K. Epstein and Morris Katzman, Chicago, Ill., assignors to The Emulsol Corporation, Chicago, Ill.

No Drawing. Application July 30, 1938, Serial No. 222,150

23 Claims. (Cl. 260—401)

Our invention relates to a new class of chemical substances, and more in particular to a new class of chemical substances having capillary active properties and particularly adapted for use as detergents, wetting, penetrating, emulsifying, lathering, flotation and anti-spattering agents, and for frothing purposes.

The principal object of the present invention is the provision of a new class of chemical substances capable of satisfactory use in connection with the problems and fields hereinabove and hereinafter discussed.

Another object is the provision of a new class of chemical substances which are in general of relatively simple structure and can be cheaply made in commercial quantities.

Another object is the provision of a new class of chemical substances having improved wetting and detergent characteristics.

Other objects and features of the invention will be apparent from a consideration of the following detailed description.

The substances of the invention are in general esters, preferably of lower molecular weight carboxylic or fatty acids with at least one unesterified sulphonic acid group in the carboxylic or fatty acid radical, wherein the group esterified with the sulpho-carboxylic or sulpho-fatty acid contains nitrogen linked to carbon and a lipophile radical with at least four carbon atoms. In certain circumstances there may be more than one unesterified sulphonic acid group in the carboxylic or fatty acid radical or there may be sulphonic acid groups that are esterified and other sulphonic acid groups that are not esterified but in all cases there must be at least one unesterified sulphonic acid group in preferably the lower molecular weight carboxylic or fatty acid radical. The carboxylic or fatty acid radical with the unesterified sulphonic acid group is, as indicated, preferably of relatively low molecular weight and, for best results, should contain not more than eight carbons.

Considering the compounds from another aspect, the molecule in each instance contains a relatively high molecular weight lipophile group and a relatively low molecular weight hydrophile group which, in the class of compounds to which the present invention relates, are sulphonic acid radicals or free or unesterified OH groups in conjunction with a sulphonic acid radical. From still another angle, the compounds may be considered as combinations of a higher molecular weight lipophile group and a relatively low molecular weight sulpho-carboxylic or sulpho-fatty acid group, which may also contain an aromatic group, although such does not represent the preferred embodiment of the invention. A more complete understanding of what may comprise the lipophile group and the particular character of the sulpho-carboxylic or sulpho-fatty acid group will be had as detailed description progresses.

The function of the sulphonic acid group is to impart hydrophillic properties, that is, water wetting or water attracting properties, to the molecule as a whole. The groups which are esterified by the sulpho-carboxylic or sulpho-fatty acid are in general of a lipophile character. At times they may be strongly lipophillic and at other times moderately lipophillic. They may be of low molecular weight or of moderately high molecular weight, depending upon the purpose for which the substances may be used.

More specifically, most of the substances of the invention are lower molecular weight sulpho-carboxylic acid esters of alcohol amines, preferably those containing more than one esterifiable hydroxy group, wherein at least one of the hydroxy groups of the alcohol amine is esterified or etherified with a carboxylic acid or an alcohol, as the case may be, containing at least four carbon atoms and preferably between eight and eighteen carbon atoms.

In some cases, hydrogen attached to nitrogen may be connected to the lipophile radical so as to form amides, as illustrated by Formulae 3, 5, 6, and 7 in the list of compounds shown hereinafter. These compounds function essentially similarly to those wherein the lipophile radical is attached at an hydroxy group of the alcohol amine to form an ether or ester.

Illustrative examples of compounds falling within the scope of the invention are as follows:

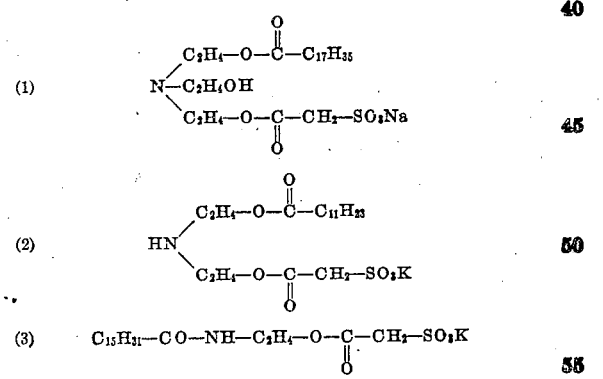

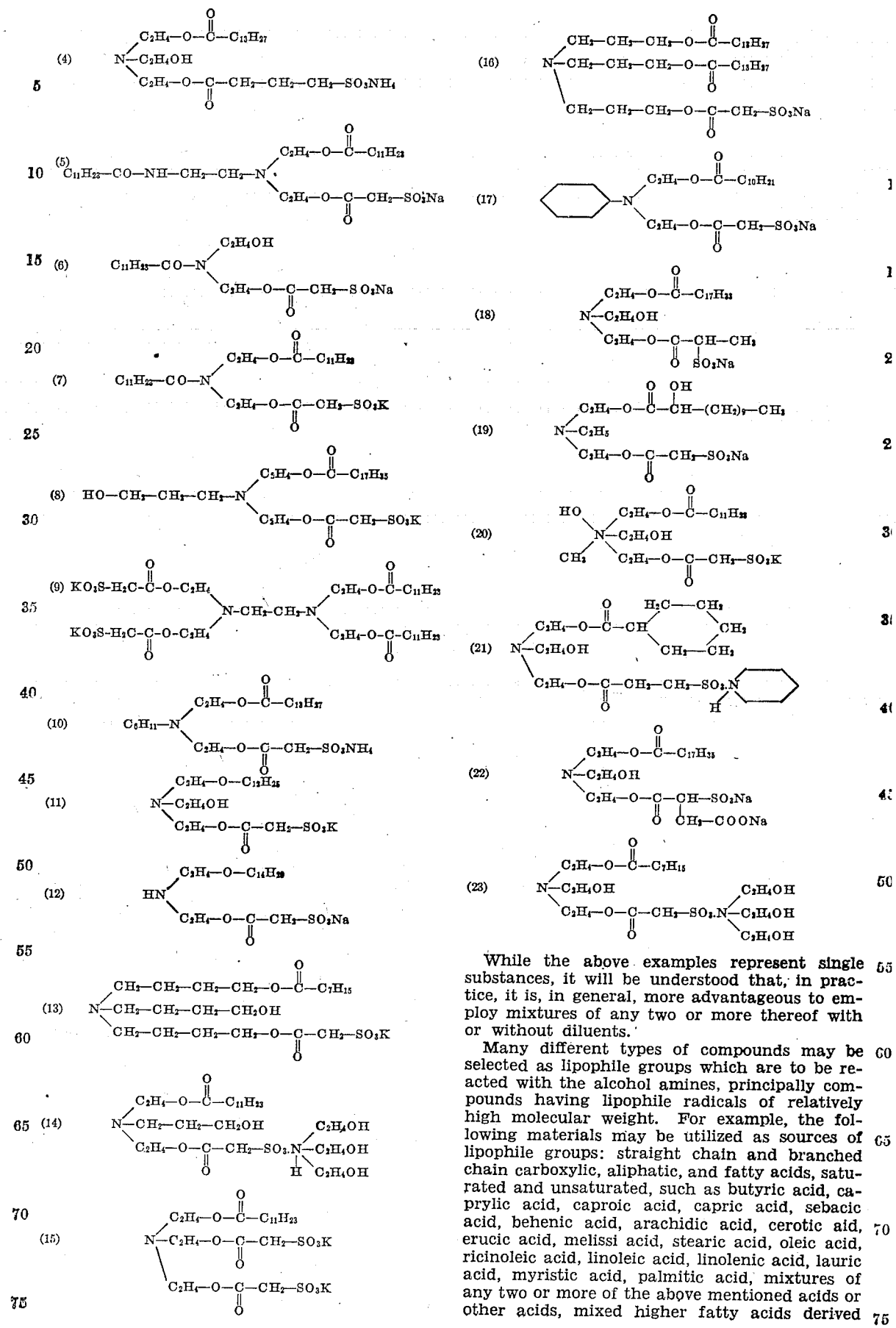

While the above examples represent single substances, it will be understood that, in practice, it is, in general, more advantageous to employ mixtures of any two or more thereof with or without diluents.

Many different types of compounds may be selected as lipophile groups which are to be reacted with the alcohol amines, principally compounds having lipophile radicals of relatively high molecular weight. For example, the following materials may be utilized as sources of lipophile groups: straight chain and branched chain carboxylic, aliphatic, and fatty acids, saturated and unsaturated, such as butyric acid, caprylic acid, caproic acid, capric acid, sebacic acid, behenic acid, arachidic acid, cerotic aid, erucic acid, melissi acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oil, whale oil, shark oil, partially or completely hydrogenated animal and vegetable oils such as those mentioned; hydroxy and alphahydroxy higher aliphatic and fatty acids such as i-hydroxy stearic acid, dihydroxy stearic acid, α-hydroxy stearic acid, α-hydroxy palmitic acid, α-hydroxy lauric acid, α-hydroxy coconut oil mixed fatty acids, and the like; other substituted fatty acids such as

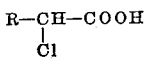

where R is a higher molecular weight hydrocarbon radical; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid, and abietic acid; aromatic acids such as phthalic acid, benzoic acid, naphthoic acid, pyridine carboxylic acids; hydroxy aromatic acids such as salicylic acid, hydroxy benzoic and naphthoic acids, and the like; and substitution and addition derivatives such as amino, halogen, hydroxy, sulphate, sulphonic, phosphate and the like substitution and addition derivatives of the aforementioned carboxylic substances. It will be understood that mixtures of any two or more of said acids may be employed.

The alcohol amines which provide the linkage between the lipophile group and the sulpho-carboxylic group may be selected from a large class and include primary, secondary and tertiary alcohol amines and alkylolamines, symmetrical, unsymmetrical, normal and iso-derivatives, such as monoethanolamine, diethanolamine, triethanolamine and mixtures thereof such as occur in the so-called commercial triethanolamine, propanolamine, dipropanolamine, butanolamine, iso-butanolamine, pentanolamine, hexanolamine, decylolamine, laurylolamine, hexadecylolamine, octodecylolamine, cyclohexyl ethanolamine, N-cyclohexyl butanolamine, ethanolaniline, monomethyl-ethanolamine, triethanol methyl ammonium hydroxide, diethanol-butanolamine, diethanolamine cyclohexylamine, monobutyl ethanolamine, diethanol methyl amine, alkylolamines of other monovalent or polyvalent alcohols such as glycols, glycerol, sugars, and sugar alcohols such as sorbitol, alkylol polyamines such as alkylol derivatives of ethylene diamine, diethylene triamine and triethylene tetra-amine, arylolamines such as N-phenyl ethanolamine, and the like. The alcohol or alkylol radicals of the alcohol amines or alkylolamines may contain substituent groups such as amino, nitrile, carboxyl, hydroxy, halogen, sulphate, sulphonic, phosphate, and the like and the sequence of carbon atoms therein may be interrupted by O, S, C=O, NH, NR where R is alkyl, and the like.

The linkage between the alcohol amine substance and the lipophile group need not be an ester linkage, although such is preferred, but it may be an ether linkage, as illustrated by compounds numbered 11 and 12 hereinabove.

From a study of the compounds which are listed hereinabove, those skilled in the art will understand that many different expedients may be employed for forming the compounds in so far as the dominant lipophile group and the relatively low molecular weight sulpho-carboxylic or fatty acid group are concerned. As stated, however, ester linkages are utilized between these two portions of the compound, and the skilled chemist will understand in general the most approved practices in securing this result. Numerous methods are also available for the introduction of the sulphonic acid group. In the case of aromatic sulphonic acids, of course, standard sulphonation procedures employed for producing aromatic sulphonic acids may be used, and, if desired, the lipophile group may be introduced subsequently.

In the case particularly of aliphatic sulphonic acids, a reactive halogen may be caused to react with an alkali sulphite such as sodium sulphite, potassium sulphite, ammonium sulphite or lithium sulphite or some other sulphite in aqueous solution, if desired.

Another method is to introduce a sulph-hydryl or disulphide or some other suitable sulphur group and then oxidize to the sulphonic acid with nitric acid or a permanganate or some other oxidizing agent.

Still another method of introducing the sulphonic group is as follows: One or more esterifiable hydroxyl groups of an alkylolamine such as triethanolamine or a lipophile derivative thereof may be caused to react, under suitable conditions, with sulpho-acyl halides such as are represented by the formula:

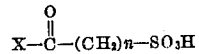

wherein X is halogen, particularly chlorine or bromine, and n is a small whole number, at least one. The sulpho-acyl halides may also be of the type wherein the sulphonic group is attached to an intermediate carbon instead of to the terminal carbon as illustrated above.

Another method which may also be employed to produce the compounds of the present invention involves reacting an alcohol amine such as triethanolamine, or a lipophile derivative thereof, there being at least one free hydroxy group present in the alcohol amine nucleus, with a sulphoacyl anhydride the sulphonic group of which may be attached to either the terminal or an intermediate carbon atom of the sulpho-acyl anhydride.

The preferred process comprises reacting a lipophile derivative of an alcohol amine, containing at least one free or esterifiable hydroxy group, with a halogeno-carboxylic acid such as chloracetic or bromacetic acid, or with a halogeno-carboxylic acid halide such as chloracetyl chloride or bromacetyl bromide, to form a chloracetate or bromacetate, and then converting the latter into the sulphonic acid derivative by reaction with an alkali sulphite. Other halogenocarboxylic acids or derivatives thereof which may be utilized are those derived from mono-, di-, and poly-carboxylic acids including, for example, iodo acetic acid, alpha-chlor propionic acid, alpha-chlor butyric acid, alpha-brom capric acid, mono-chlor succinyl chloride, di-chlor succinyl chloride, mono-chlor succinic acid, di-chlor succinic acid, mono- and di-brom glutaric acid and the corresponding glutaryl bromides, nitrochloro-benzoyl chlorides, and the like. Of particular utility are the halogeno-acetic acids and their halides.

Instead of initially producing the lipophile derivative of the alcohol amine and then introducing the sulpho-carboxylic acid radical, the lipophile radical may be introduced subsequent to the introduction of the sulpho-carboxylic acid radical by reaction preferably with a higher fatty acid halide or other lipophile radical. Thus, for example, an alcohol amine such as triethanolamine may be reacted with chloracetyl chloride in such proportions as to esterify one or more hydroxy groups, however, leaving free at least one hydroxy group. The resulting halogen-containing ester may then be reacted with the required amount of an alkali sulphite in aqueous media to replace the halogen group by a sulphonic group. The resulting sulpho-carboxylic acid ester of the alcohol amine may then be isolated and purified or reacted in the impure state but in dry form with an equivalent amount of a long chain or higher molecular weight acyl halide to esterify the remaining free hydroxy group.

The following examples are illustrative of the preparation of compounds falling within the scope of the invention. It will be understood, of course, that said examples are given only by way of illustration and are not to be considered in any way limitative of the true scope of the invention. Thus, for example, other methods may be employed, the proportions of reacting ingredients and times and temperatures of reaction may be varied, and supplementary processes of purification may be resorted to wherever found desirable or convenient. These and other variations and modifications will be evident to those skilled in the art in the light of the guiding principles disclosed herein.

Example A (1) 27.6 grams of the monocaprylic acid ester of commercial triethanolamine were disssolved in 100 cc. of petroleum ether and 11.3 grams of chloracetyl chloride were added dropwise thereto, the reaction mass being stirred and maintained at about 5 degrees C. during the addition. The mixture was then heated for about 1 hour on the boiling water bath until the petroleum ether evaporated. The resulting product was a paste.

(2) To the product resulting from part (1) hereof, 16.4 grams of sodium sulphite and 50 cc. of water were added and the mass was stirred at 95 degrees C. for 3 hours. The final product, in the form of a paste, contained a substantial amount of a compound which may be illustrated graphically.

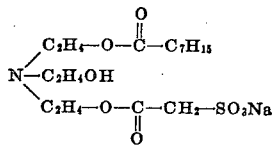

It had useful properties adapting it for uses of the character hereinafter mentioned.

(3) The product of part (2) hereof was purified by adding thereto 6 volumes of boiling isopropyl alcohol, filtering off the inorganic salts, and cooling the alcohol solution to crystallize out the desired compound. The final product had good foaming, wetting and similar properties such as those described hereinafter.

Example B (1) 27.6 grams of the monocaprylic acid ester of commercial triethanolamine, dissolved in 100 cc. of petroleum ether, were reacted with 22.6 grams of chloracetyl chloride in the manner described in part (1) of Example A.

(2) To the reaction product of part (1) hereof, 34.0 grams of sodium sulphite and 100 cc. of water were added, and the mixture was reacted as described in part (2) of Example A. The paste resulting from this reaction contained a substantial proportion of a compound having the formula

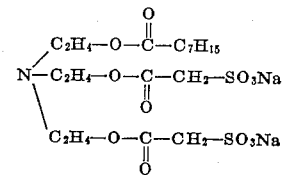

Its properties were similar to those of the product of Example A.

(3) The reaction product of part (2) hereof may be purified as described in Example A.

Example C (1) One mol of lauric acid and about 1½ mols of monoethanolamine were heated for 5¼ hours at a temperature of 150 degrees C.–222 degrees C. while continuously passing steam through the reaction mixture while maintaining the latter under reduced pressure, until the free fatty acids were decreased to 0.3%. The resulting product comprised a mixture of about 5% of the lauric acid ester of monoethanolamine and about 95% of the lauric acid amide of monoethanolamine. The product was washed free of the excess monoethanolamine with hot water, three washings being employed and each time the product was salted out with sodium chloride. An excess of ether was then added thereto, the mass was heated to the boiling point of the ether, anhydrous sodium sulphate was added thereto, the ether layer was poured off and the ether was then evaporated.

(1—a) In order to obtain essentially complete amidification with little or no ester formation and to form light-colored compositions at somewhat lower temperatures, the methyl or ethyl ester of lauric acid may be reacted with mono-ethanolamine at about 150 degrees C. to 180 degrees C. until the methyl alcohol or ethyl alcohol, as the case may be, formed in the reaction is volatilized.

(2) To 123 grams of the product obtained in part (1) hereof, 74 grams of chloracetic acid were added and the mixture was heated for 2 to 3 hours at 150 degrees C.–190 degrees C. The resulting product was then washed three times with hot water (80–90 degrees C.) until it was free of acid. The product was liquid at room temperature.

(3) To 66.4 grams of the washed product of part (2), 26.6 grams of potassium meta bisulphite ($K_2S_2O_5$), 13.3 grams of potassium hydroxide, 0.6 grams of potassium iodide, and 80 cc. of water were added and the resulting mixture was heated for 2 hours with stirring at 80 degrees C.–88 degrees C.

(4) To the produce resulting from part (3) hereof, 6 volumes of isopropyl alcohol were added and the mixture was brought to a boil and then filtered to remove the inorganic salts. To the filtrate 3 more volumes of isopropyl alcohol were added, the solution was cooled in an ice bath, and the material which crystallized out was filtered off and dried. It was a hard, crystalline solid, light brown in color and had good wetting properties and other properties such as those described hereinafter.

In those cases where a tertiary alcohol amine, such as triethanolamine, tripropanolamine or the like is employed, it is clear, of course, that esters only can be formed by reacting the same with chloracetic acid, chloracetyl chloride, higher molecular weight fatty acids or their acyl halides or the like. In the case of such reactions wherein primary and secondary alcohol amines, such as monoethanolamine or diethanolamine, are employed, mixtures of amides and esters usually result, in many cases the amides preponderating. To bring about more complete ester formation should such be desired, the following procedure may be employed: To monoethanolamine, for example, an aldehyde such as formaldehyde, benzaldehyde or the like may be added, this serving to block the amino group. The resulting mixture may then be reacted with chloracetyl chloride or the like whereby the corresponding ester is produced. The resulting reaction product may then be treated with dilute acid solution, for example, weak hydrochloric acid, under mild conditions, to free the amino group, and then the reaction with an acyl halide such as lauroyl chloride may be carried out.

Those substances which are freely soluble in water may be recovered from their solutions in the customary manner by concentration and crystallization. As stated hereinabove, as the mass of the lipophile radical increases, solubility decreases and affinity for water is manifested by the dispersibility in water. From these dispersions, the substances may be readily recovered by "salting out" with suitable soluble electrolytes. Common salt is very satisfactory for this purpose in most cases. When salted out of an aqueous dispersion at temperatures ranging from 60 to 95 degrees C., the substances are obtained in the form of a paste with a water content ranging from approximately 25 to 75%. The more hydrophillic the substance, the greater the water content, and, of course, the salt is present in the water of the paste in approximately the same concentration in which it existed in the dispersion from which the paste was salted out.

Many of the compounds of the present invention may be represented by the general formula R—COO—R$_1$ wherein R denotes a lower molecular weight aliphatic radical containing at least one sulphonic acid radical and R$_1$ denotes a radical of an alcohol amine containing a lipophile radical.

Many of the compounds of the invention may also be represented by the general formula

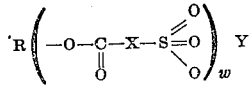

wherein R is a radical of an alcohol amine containing a lipophile group with at least four carbon atoms and preferably from twelve to eighteen carbon atoms, X is the carbon-hydrogen residue of the sulpho-carboxylic acid, Y is a cation, and $w$ is a small whole number, at least one.

Still others of the compounds of the invention may be represented by the following general formula:

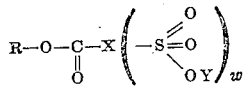

wherein R is the residue of an alcohol amine containing a plurality of esterifiable hydroxy groups and wherein the hydrogen of at least one hydroxyl group is substituted by an alkyl or acyl group containing at least four carbon atoms and preferably between eight and eighteen carbon atoms, X is the carbon-hydrogen residue of the sulpho-carboxylic acid, Y is a cation, and $w$ is a small whole number, at least one.

At least many of the compounds of the present invention have utility in various arts in which interface modifying agents are employed. They are resistant to precipitation by calcium and magnesium salts and are compatible with acid and alkali media. They may be utilized in washing and laundering and in the textile and related industries wherein they function for softening, wetting, detergent, emulsifying, penetrating, dispersing, frothing and foaming purposes. The textiles, various treatments of which in the presence of the agents of the present invention is rendered effective, comprise natural products such as cotton, wool, linen and the like as well as the artificially produced fibres (and fabrics), such as rayon, cellulose acetates, cellulose ethers and similar artificial products. It will be understood, of course, that the agents may be used in aqueous and other media either alone or in combination with other suitable salts of organic or inorganic character or with other interface modifying agents. In the dyeing of textiles they may be employed as assistants in order to bring about even level shades. They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of cosmetic creams such as cold creams, vanishing creams, tissue creams, shaving creams of the brushless and lathering type and similar cosmetic preparations. Another use to which the agents of our invention may be placed is for the treatment of paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess marked utility in the ore dressing industry wherein they function effectively in froth flotation processes. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, as pickling inhibitors in metal cleaning baths, in shoe polishes, in rubber compositions, for breaking or demulsifying petroleum emulsions such as those of the water-in-oil type which are encountered in oil-field operations, and for various other purposes which will readily occur to those versed in the art in the light of our disclosure herein.

As detergents, they may be employed for the preparation of shampoos, dentifrices and the like. In general, they may be dissolved in water or aqueous media and utilized in that form or, in the case of solid products, they may be packaged and sold in such form preferably mixed with diluents. They may also be utilized for commercial cleansing, laundering and washing operations with marked advantage.

The products of the present invention may be employed alone or together with lesser or greater quantities of inorganic or organic compounds. Thus, for example, they may be employed together with salts such as sodium chloride, alkali metal phosphates including pyrophosphates and tetraphosphates, sodium sulphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophillic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alcohol or alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulphosuccinate, dilauryl potassium sulphoglutarate, lauryl monoethanolamine sulpho-acetate, and the like; sulphuric and sulphonic derivatives of condensation products of alkylolamines and higher fatty acids; Turkey-red oils; compounds of the type of isopropyl naphthalene sodium sulphonate, and other classes of wetting agents.

It will be understood that the products may be employed in the form of impure reaction mixtures containing substantial proportions of the effective interface modifying agent or agents or, if desired, for any particular purposes, purification procedures may be employed to produce pure or substantially pure products. Those versed in the art are familiar with the types of purification methods which may be employed with advantage herein, particularly in the light of the disclosures made hereinabove.

In the event that the compounds of the invention are made by reacting the halogen derivatives with alkali sulphites or other soluble sulphites as well as thio-sulphates, the corresponding alkali sulphonic acid derivative will be produced. The term alkali is employed to include the ammonium radical ($NH_4$). When prepared by other methods so that the compounds contain the sulphonic acid group ($-SO_3H$), the hydrogen thereof may be replaced by other cations such as calcium, magnesium, aluminum, zinc, amines, alkylolamines such as mono-, di- and triethanolamine and mixtures thereof, other organic nitrogenous bases such as pyridine and piperidine, tertiary amines, quaternary ammonium bases such as tetra-methyl ammonium hydroxide, etc., as described, for example, in the application of Morris B. Katzman, Serial No. 219,358, filed July 15, 1938. It will be understood that by the term "cation", as used throughout the specification and claims, is meant hydrogen and such other elements as are mentioned herein, and, in general, atoms or radicals which are regarded as bearing a positive charge or capable of replacing acidic hydrogen.

It will be understood that the selection of the particular halogen derivatives which are utilized in the preparation of the halogen-carboxylic acid ester intermediate products will depend upon certain factors. Thus, while bromo- and iodo-derivatives, in general, react slightly more rapidly than do the chloro- derivatives, the relatively cheaper cost of the latter will generally justify their use from a purely economic standpoint.

The term "residue", as used throughout the specification and claims, is employed in its ordinarily understood chemical significance. For example, where one of the hydroxyl groups of triethanolamine is esterified with a fatty acid and another of the hydroxyl groups of the triethanolamine is esterified with a sulpho-carboxylic acid, that which remains of the triethanolamine molecule, for example

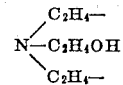

is the "residue" of the alcohol amine, in this case triethanolamine.

Similarly, the term "carbon-hydrogen residue" of a sulpho-carboxylic acid is employed as in conventional chemical nomenclature. Thus, for example, if sulpho-acetic acid

is esterified with triethanolamine, the group $-CH_2-$ is to be considered as the "carbon-hydrogen residue" of the sulpho-acetic acid.

Unless otherwise indicated, the term "higher", wherever employed in the claims, will be understood to mean at least eight carbon atoms and, concomitantly, the term "lower" will mean less than eight carbon atoms.

Whenever the term sulpho-carboxylic ester, sulphoacetate, or the like expression is employed in the claims, it will be understood to cover the compounds irrespective of whether the hydrogen of the sulphonic acid is present as such or replaced by another cation.

What we claim as new and desire to protect by Letters Patent of the United States is:

1. Sulpho-carboxylic esters corresponding to the general formula $R-COO-R_1$ in which R denotes a radical containing less than eight carbon atoms and at least one sulphonic group, and $R_1$ denotes a radical of an alcohol amine containing a lipophile radical.

2. Sulpho-carboxylic esters corresponding to the general formula $R-COO-R_1$ in which R denotes an aliphatic radical containing less than eight carbon atoms and at least one sulphonic group, and $R_1$ denotes a radical of an alkylolamine containing a lipophile radical having between twelve and eighteen carbon atoms.

3. Sulpho-acetates of alkylolamines wherein at least one hydrogen of the alkylolamine is replaced by a lipophile radical containing at least eight carbon atoms.

4. Sulpho-acetates of alkylolamines wherein at least one hydrogen of the alkylolamine is replaced by an aliphatic-carboxylic acyl radical containing between twelve and eighteen carbon atoms.

5. Sulpho-carboxylic esters corresponding to the general formula $R-COO-R_1$ in which $R-COO$ denotes a sulphoacetic acid radical, and $R_1$ denotes a radical of an alkylolamine containing an aliphatic radical having at least eight carbon atoms.

6. A sulpho-acetate of an ethanolamine wherein the hydrogen of one hydroxyl group of the ethanolamine is substituted by a straight chain aliphatic radical having at least eight carbon atoms.

7. An ester of an ethanolamine, the hydrogen of one hydroxyl group of which is substituted by a sulpho-acetic acid radical, and the hydrogen of one hydroxyl group of which is substituted by a straight chain higher molecular weight aliphatic radical containing from twelve to eighteen carbon atoms.

8. A chemical compound corresponding to the formula

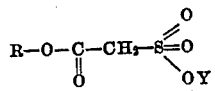

wherein Y is an alkali metal and R is an alkylolamine radical containing a plurality of hydroxy groups and in which the hydrogen of one hydroxy group is substituted by a straight chain aliphatic radical containing at least eight carbon atoms.

9. A carboxylic ester of sulpho-acetic acid, the sulphonic group of which is unesterified, wherein the radical esterified with the sulpho-acetic acid is a triethanolamine radical containing a straight chain aliphatic radical having at least eight carbon atoms.

10. A sulpho-carboxylic acid ester represented by the general formula:

$$R\left(-O-C-X-S=O\atop\|\quad\quad\|\atop O\quad\quad O\right)_w Y$$

wherein R is an alcohol amine radical containing at least one lipophile group with at least four carbon atoms, X is the carbon-hydrogen radical of the sulpho-carboxylic acid having less than eight carbon atoms, Y is a cation, and $w$ is a small whole number, at least one.

11. Sulphocarboxylic esters corresponding to the general formula R—COO—R₁ in which R—COO denotes a sulphoacetic acid radical, and R₁ denotes a radical of an alkylolamine esterified with a fatty acid containing between twelve and eighteen carbon atoms.

12. Sulpho-carboxylic esters corresponding to the general formula R—COO—R₁ in which R—COO denotes a sulphoacetic acid radical, and R₁ denotes a radical of triethanolamine esterified with a higher fatty acid containing from twelve to eighteen carbon atoms.

13. A sulpho-acetate of an ethanolamine wherein one hydrogen of the ethanolamine is substituted by a straight chain higher molecular weight aliphatic radical.

14. Esters of lower fatty acids having less than eight carbon atoms and alkylolamines esterified with higher fatty acids having at least eight carbon atoms, said esters containing a sulphonic group on the alkyl portion of the acyl group of the lower fatty acid.

15. Triethanolamine in which the hydrogen of at least one hydroxyl group is replaced by a carboxylic acyl radical having at least eight carbon atoms and in which the hydrogen of at least one hydroxyl group is replaced by a sulpho-carboxylic acid radical having less than eight carbon atoms.

16. A sulpho-carboxylic acid ester of an ether derivative of an alkylolamine, the sulpho-carboxylic acid radical containing less than eight carbon atoms, and the ether radical of the derivative of the alkylolamine containing at least eight carbon atoms.

17. Triethanolamine in which the hydrogen of at least one hydroxyl group is replaced by an alkyl radical having at least eight carbon atoms and in which the hydrogen of at least one hydroxyl group is replaced by a sulpho-carboxylic acid radical having less than eight carbon atoms.

18. A process of preparing sulpho-carboxylic esters which comprises esterifying a compound in the form of an alcohol amine the hydrogen of at least one hydroxyl group of which is replaced by an aliphatic radical containing at least eight carbon atoms, said compound containing at least one free hydroxy group attached to the alcohol amine nucleus, by means of a member selected from the group consisting of halogen-containing aliphatic monocarboxylic acids and derivatives thereof having less than eight carbon atoms, and then reacting the resulting compound with a member selected from the group consisting of alkali metal and ammonium sulphites.

19. The process which comprises reacting a halogen-containing ester of an alkylolamine containing an aliphatic radical having at least eight carbon atoms and an aliphatic monocarboxylic acid having less than eight carbon atoms, the halogen being attached to the alkyl portion of the acyl group, with a member selected from the group consisting of alkali metal and ammonium sulphites whereby the halogen is replaced by a sulphonic acid radical.

20. The process which comprises reacting a member of the group consisting of chlor acetic acid, brom acetic acid, chlor acetyl chloride and brom acetyl bromide with a compound in the form of triethanolamine the hydrogen of at least one hydroxyl group of which is replaced by a radical containing at least eight carbon atoms, said compound containing at least one hydroxy group attached to the triethanolamine nucleus, with a member selected from the group consisting of alkali metal and ammonium sulphites whereby the halogen is replaced by a sulphonic acid radical.

21. The process which comprises reacting higher fatty acid esters of triethanolamine, the fatty acid radicals of which contain between twelve and eighteen carbon atoms, said esters containing at least one free hydroxy group attached to the triethanolamine nucleus, with a member selected from the group consisting of chlor acetic acid, brom acetic acid, chlor acetyl chloride and brom acetyl bromide, and then reacting the resulting compound with a member selected from the group consisting of alkali metal and ammonium sulphites whereby the halogen is replaced by a sulphonic acid radical.

22. Sulphocarboxylic acid esters of alcohol amines, the alcohol amine radical containing a lipophile group having at least eight carbon atoms, the sulphocarboxylic acid radical containing less than eight carbon atoms.

23. Chemical compounds having the formula

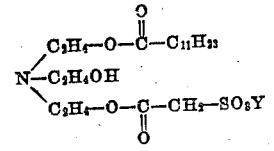

wherein Y is a cation selected from the group consisting of alkali metals and ethanolamines.

ALBERT K. EPSTEIN.
MORRIS KATZMAN.